Figures 1, 14:
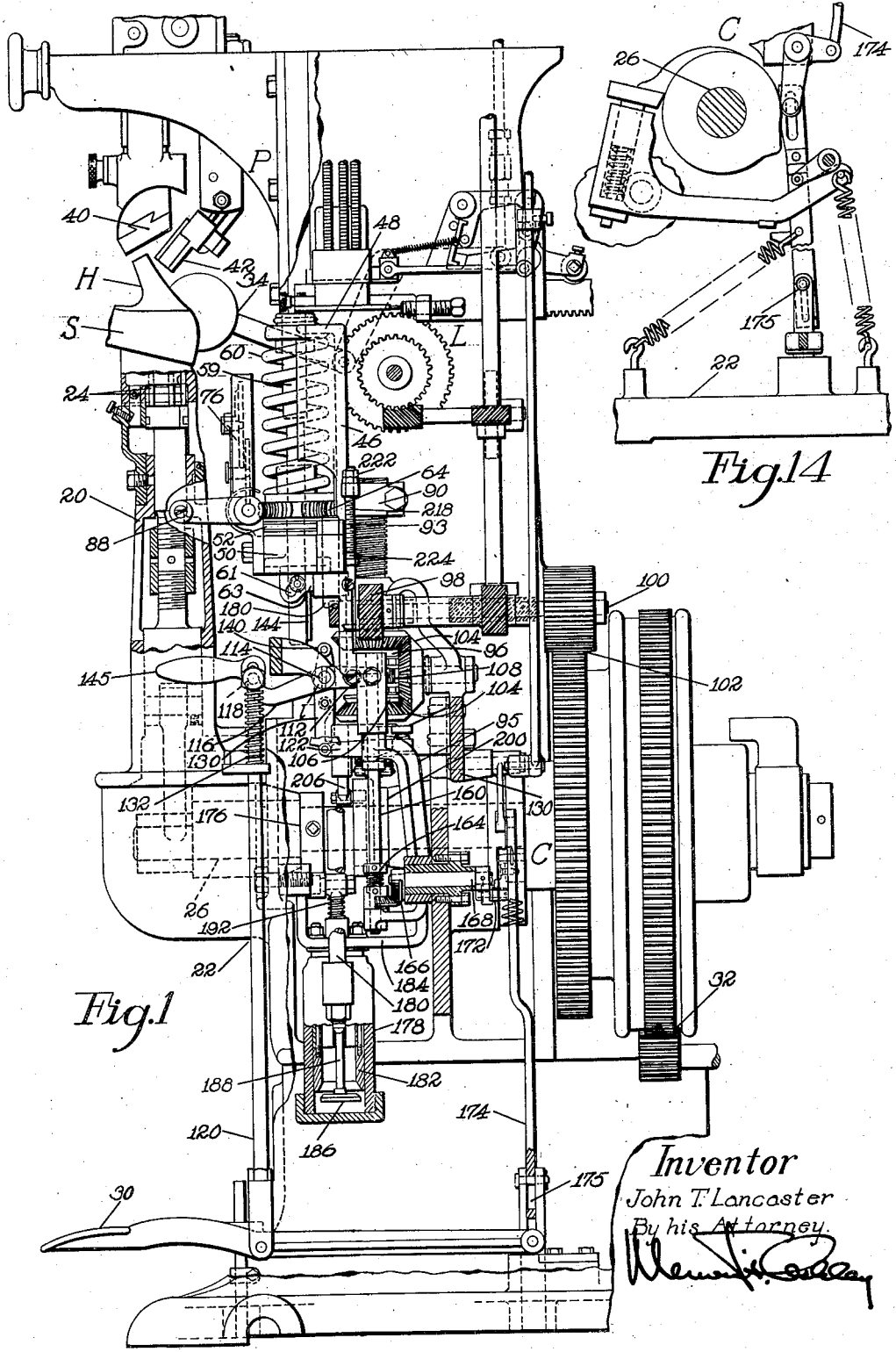

Oct. 12, 1948.　　　J. T. LANCASTER　　　2,450,969
PRESSURE MECHANISM

Filed March 10, 1945　　　7 Sheets-Sheet 1

Inventor
John T. Lancaster
By his Attorney

Oct. 12, 1948.   J. T. LANCASTER   2,450,969
PRESSURE MECHANISM

Filed March 10, 1945   7 Sheets-Sheet 2

Inventor
John T. Lancaster
By his Attorney

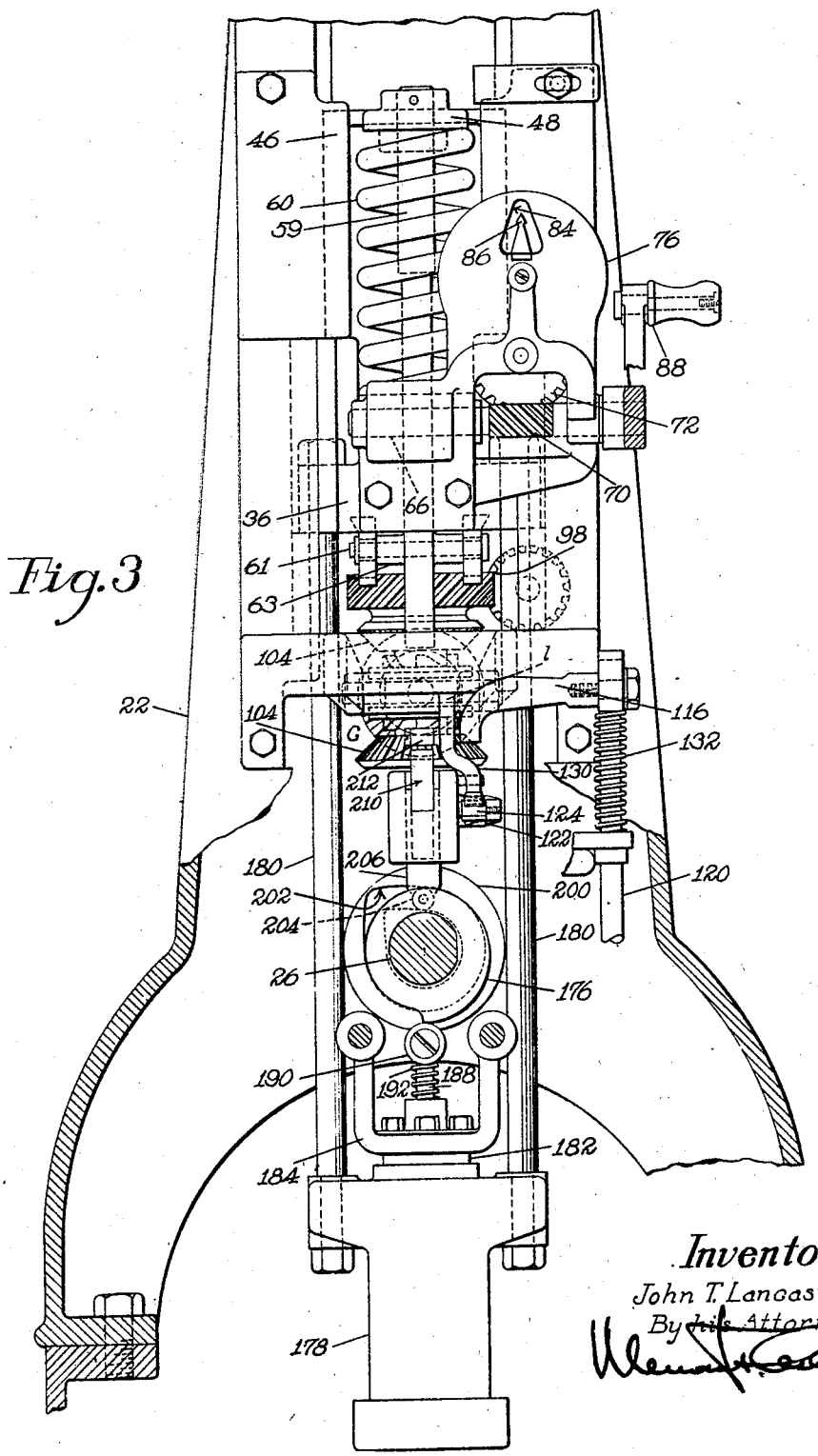

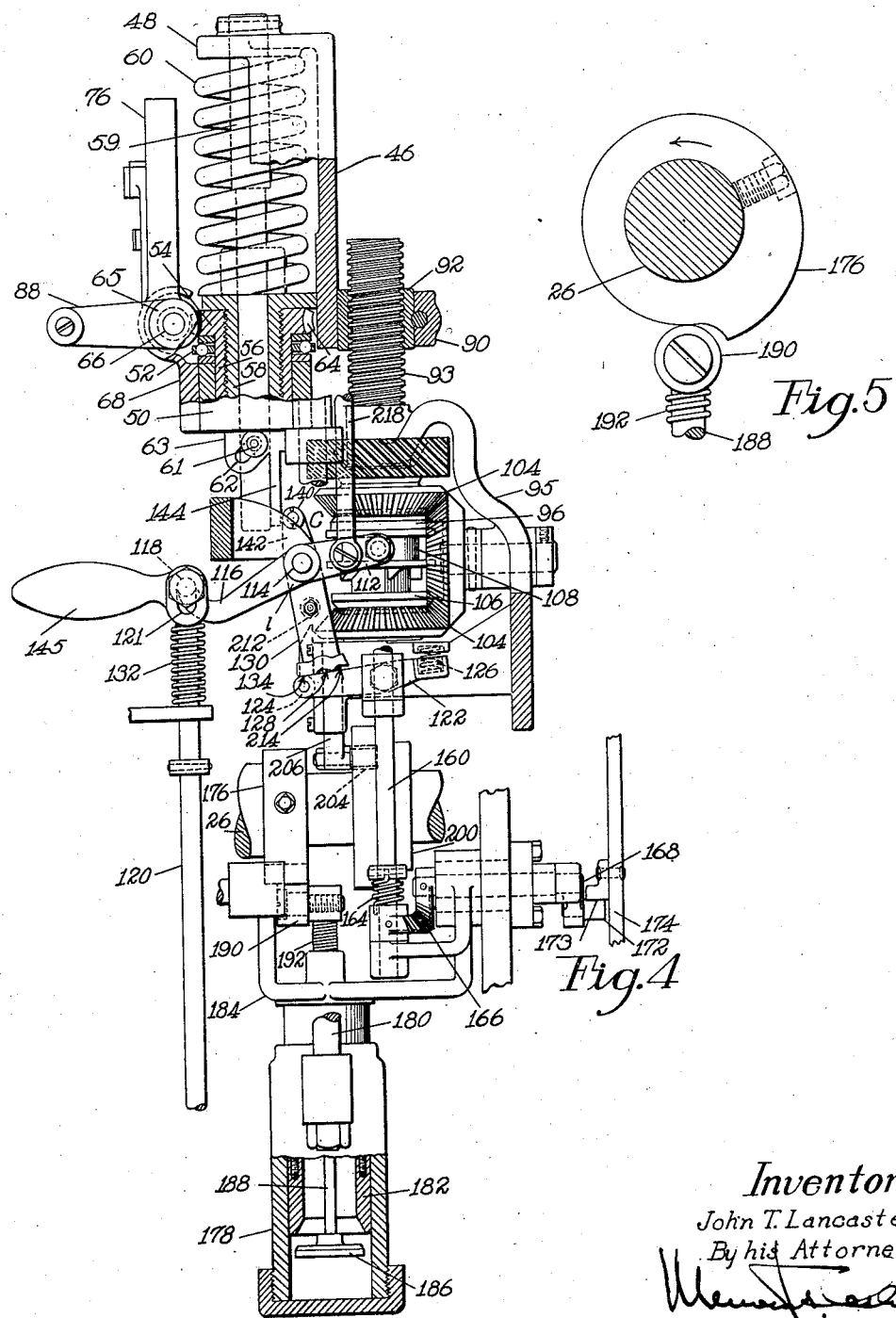

Oct. 12, 1948.  J. T. LANCASTER  2,450,969
PRESSURE MECHANISM
Filed March 10, 1945  7 Sheets-Sheet 6

Inventor
John T. Lancaster
By his Attorney

Oct. 12, 1948.   J. T. LANCASTER   2,450,969
PRESSURE MECHANISM
Filed March 10, 1945   7 Sheets-Sheet 7
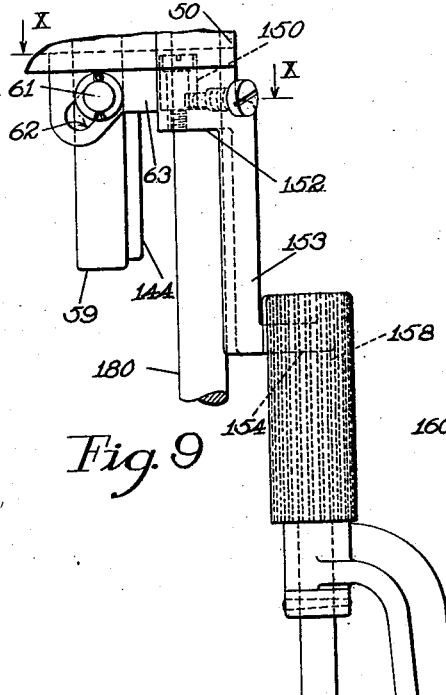
Fig. 9
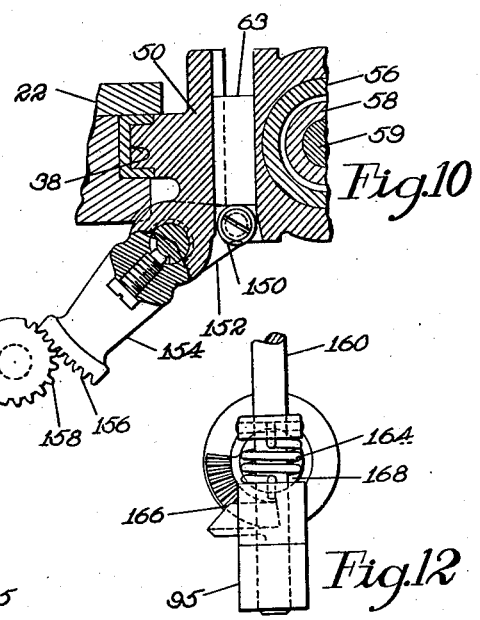
Fig. 10
Fig. 12
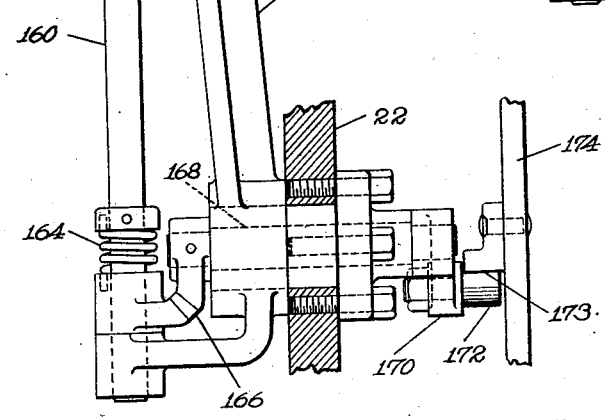
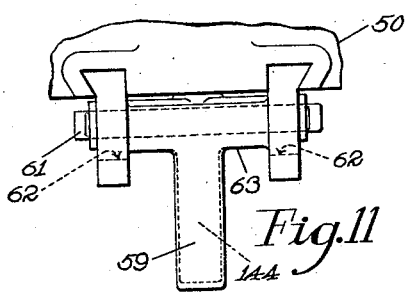
Fig. 11
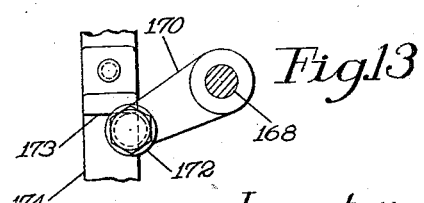
Fig. 13
Inventor
John T. Lancaster
By his Attorney Patented Oct. 12, 1948

2,450,969

UNITED STATES PATENT OFFICE 2,450,969

PRESSURE MECHANISM

John T. Lancaster, Newton, Mass., assignor to United Shoe Machinery Corporation, Flemington, N. J., a corporation of New Jersey Application March 10, 1945, Serial No. 582,043

24 Claims. (Cl. 1—32)

My invention relates to mechanisms through which pressure is applied to work for its retention during the performance upon it of various operations. An instance of such operations, in connection with which this invention is of special utility, is furnished by the attachment of heels to shoes.

In heel-nailing machines, as those employed for the attachment of wood heels, a shoe and heel are supported upon a jack in which reciprocate the nail-inserting drivers. To resist the displacing force of the drivers, holddown-pressure is applied to the work by a normally raised head, which, after the arrangement of the work upon the jack, is brought into contact with it through force applied by the operator to a treadle. Continued actuation of the treadle trips a clutch to first place upon the work final apply power to clamping pressure, and then to cause the operation of the drivers. The distance through which the operator's foot must move to accomplish this is considerable, and the effort required to overcome the force which returns the head to its initial position and to cause the engagement of the clutch is substantial, being exerted through a leverage unfavorable to the operator. It, therefore, adds greatly to his fatigue. Further, the clamping force applied to the work has not heretofore been capable of being altered conveniently to meet different operating conditions, as the compressibility of the heels being attached. An object of the present invention is to relieve the operator of almost all effort in the production of a clamping and operating cycle, and to provide for a ready adjustment of the holddown-force, even when the machine applying the pressure is in operation.

In the attainment of the above object, I combine in a novel manner with a work-support, as the jack of a heel-attaching machine, a co-operating pressure or holddown member, power mechanism by which relative movement between the support and pressure member from their normal positions is produced for clamping the work, a member movable by the operator to initiate the action of the power mechanism, and means for disconnecting the power mechanism from the work-clamping element being moved when the pressure has attained a predetermined amount. By this arrangement, the operator is relieved of all effort required to move the pressure member, and the member which he actuates to initiate pressure, may be designed to be so easily movable as to impose no appreciable burden. The pressure-limiting mechanism is readily adjustable to determine the degree of the clamping force, and in its action is further utilized to disconnect the power mechanism from the clamping element and stop the application of pressure, and also to join said power mechanism to mechanism which is to operate on the clamped work, as the nail-inserting drivers of the heel-attaching machine. As a result of this last connection, the clamping element is joined to a relatively fixed point, such as the frame of the machine, so the pressure - producing and pressure - limiting means is relieved of all operating strain. To complete the operating cycle, means controlled in the movement of the operating mechanism reverses the movement of the clamping element to return it to normal, this travel being stopped by means controlled in its reverse movement. Thus, the simple initiation of a power-cycle, with very limited effort and without the necessity for actuating the pressure-head or power-transmitting elements of the machine, is all that is required of the operator after the arrangement of the work upon its support. The pressure-limiting mechanism is herein shown as including a spring interposed between a primary slide or carrier for the work-engaging means, and a relatively movable secondary slide, as upon the primary slide. From the power mechanism, force is transmitted to the secondary slide and the primary slide through the secondary slide and the spring under the control of a clutch, which, as previously indicated, is shifted to start, stop and reverse the pressure-action. The secondary slide receives its movement from a screw rotated by either of two driving elements of the clutch.

Figure 2:
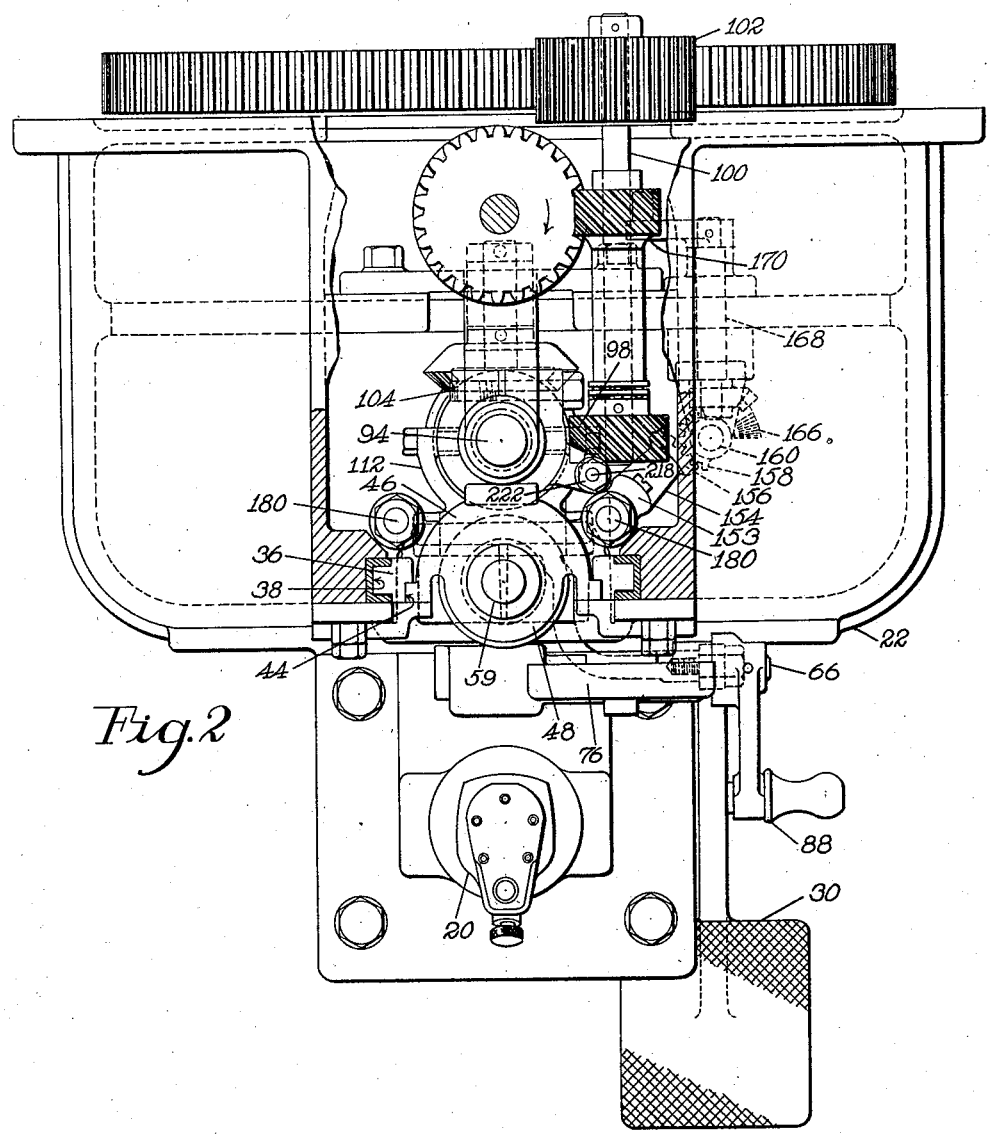
Figure 6:
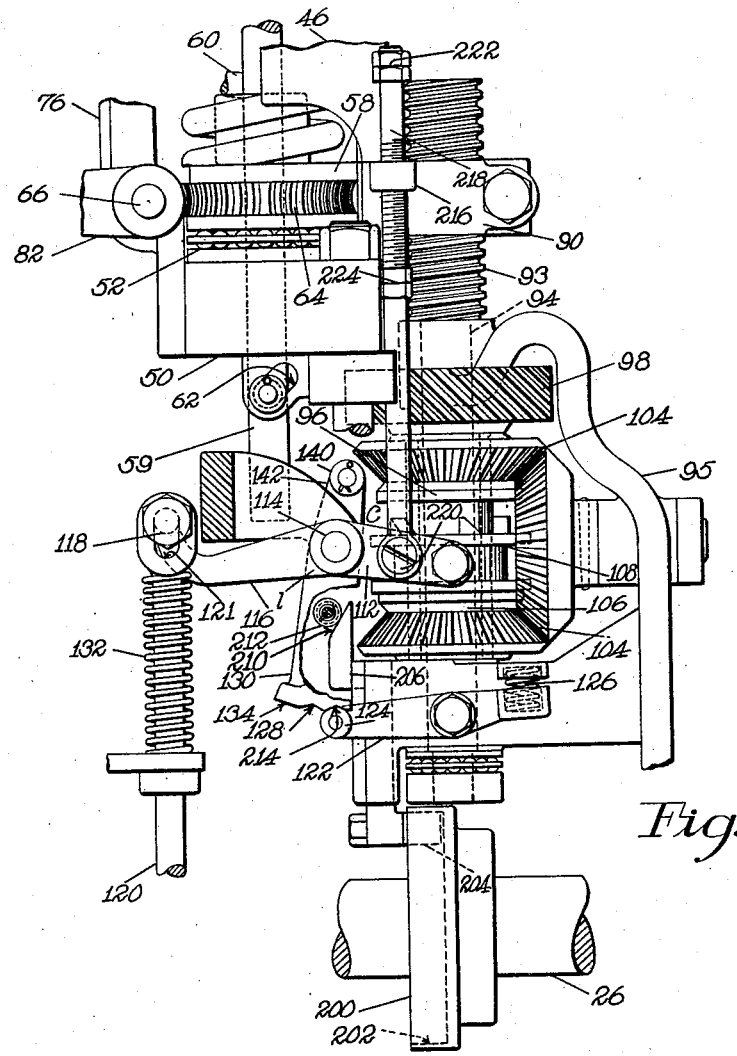
Figure 7:
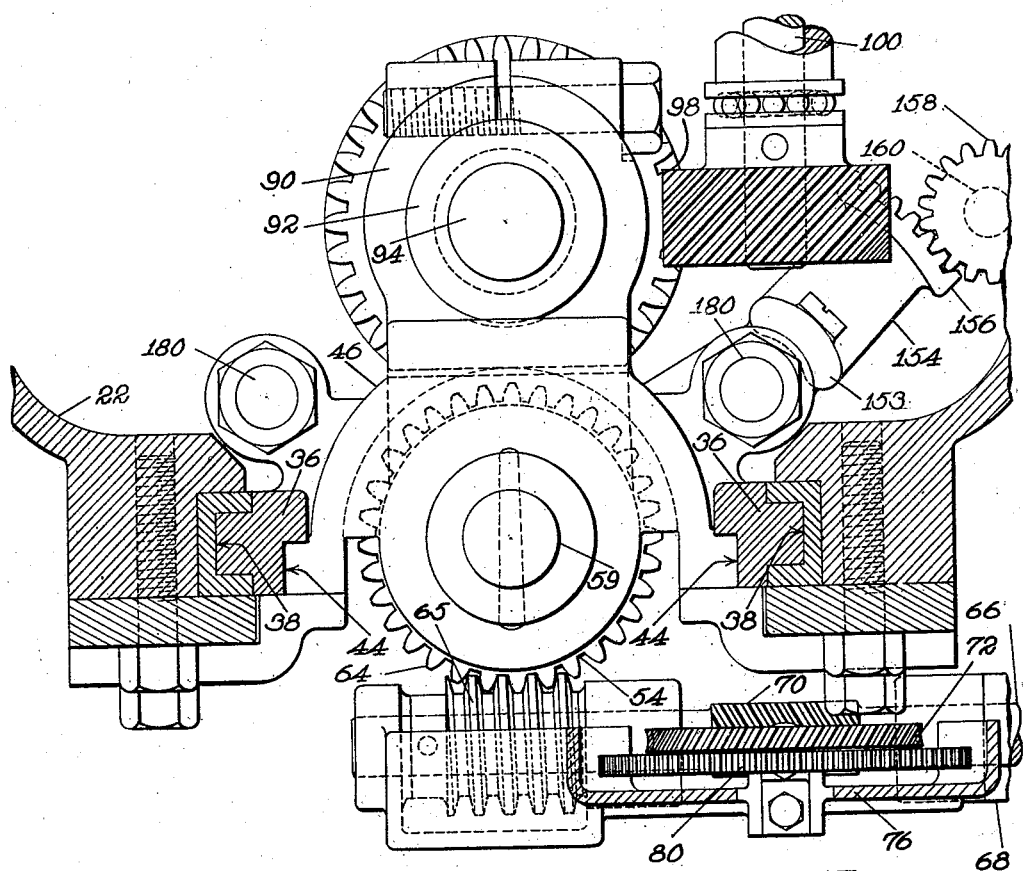
Figure 8:
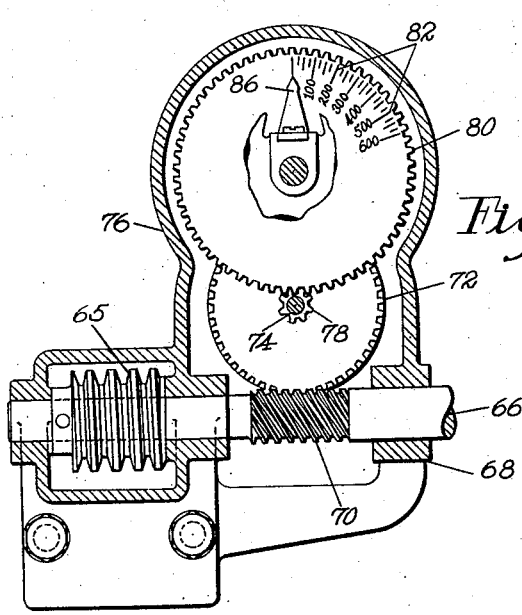

In the accompanying drawings illustrating one of many possible embodiments of my invention, Fig. 1 shows, in side elevation with parts broken away, a heel-attaching machine to which my improved pressure mechanism is applied;

Fig. 2 is a top plan view thereof, partly in section;

Fig. 3, a partial front elevation of the more essential portions of the mechanism;

Fig. 4, a broken side elevation, with the elements as related during the application of pressure;

Fig. 5, a detail in front elevation of the valve-controlling means, with the cam in pressure-locking relation;

Fig. 6, an enlarged view, similar to Fig. 4, illustrating particularly the actuating means for the holddown as the parts are related during its elevation;

Fig. 7, an enlarged broken top plan view of means for varying the pressure upon the work;

Fig. 8, a front elevation of the indicating means of Fig. 7, with its casing in section;

Fig. 9, an enlarged detail in side elevation of the means for controlling the tripping of the main clutch;

Fig. 10, an enlarged sectional detail on the line X—X of Fig. 9;

Fig. 11, a detail in elevation of the upper portion of Fig. 9, looking from the left;

Figs. 12 and 13 similar views, taken from the left of Fig. 9, and showing, respectively, the gearing between the vertical and horizontal clutch-tripping shafts and the tripping arm upon the latter shaft; and Fig. 14 shows in front elevation the mechanism for tripping the main clutch of the machine.

The present invention may be applied to a heel-attaching machine of the general character of that disclosed in Letters Patent of the United States No. 1,947,770, MacKenzie, February 20, 1934. A vertical work-supporting jack 20 (Fig. 1) is carried by a frame-column 22, in which jack nail-drivers 24 are reciprocated through connection to a main driving shaft 26. Single-rotation clutch mechanism C, engaged as a result of the depression of a treadle 30, applies to the shaft 26 power from gearing 32 to produce an operating cycle of the drivers 24. These insert, through the heel-seat of a shoe S supported upon the jack 20 and into a heel H clamped upon the heel-seat of the shoe by holddown or pressure mechanism P, nails delivered to the driver-passages in the jack by loading mechanism L reciprocated under the control of a hand-lever 34.

Considering now my improvements in the pressure mechanism, a pressure-head carried by a primary slide 36, guided at 38, 38 (Fig. 7) for vertical reciprocation in the column 22, has mounted upon it an abutment 40 for engagement with the tread-surface of the heel H and a fork 42 for contact with the inclined rear heel-surface. In ways 44, 44 upon the primary slide, a secondary slide 46 is movable (Figs. 2 and 4). At the top of the slide 46 is a forward projection 48, and vertically alined with this is a lower projection 50 from the slide 36. Resting upon the projection 50 is a thrust-bearing 52, including the upper flanged end 54 of an internally threaded sleeve 56 (Fig. 4). The thread of the sleeve 56 is engaged by an external thread on a sleeve 58, having at its upper extremity a flange which supports the lower end of a helical spring 60, upon the upper end of which bears the projection 48 of the secondary slide. Fast in the projection 48 is a rod 59, which passes down through the spring, the sleeves 56 and 58, and the projection 50 of the primary slide, and carries a transversely extending pin 61, the opposite ends of which lie in inclined slots 62 in the spaced portions of a slide 63 (Figs. 4, 9 and 11) guided in ways in the underside of the projection 50. Contact of the pin 61 with the upper ends of the slots limits the upward movement of the secondary slide upon the primary slide under the influence of the spring 60. The purpose of the movement of the slide 63 in its ways will be described later. On the periphery of the flange 54 are formed the teeth of a spiral gear 64, with which meshes a spiral pinion 65 (Fig. 7), fast upon a short shaft 66 journaled in a bracket 68 attached to the portion 50 of the primary slide. On the shaft 66 is formed a spiral pinion 70, and meshing with this is a spiral gear 72 secured to a shaft 74 rotatable in a casing 76 rising from the bracket 68 (Fig. 8). Fast on the shaft 74 is a pinion 78, meshing with a gear 80 rotatable in the upper portion of the casing 76. On the outer face of the gear 80 are inscribed graduations 82, reading in pounds. These graduations are visible through a sight-opening 84 in the casing (Fig. 3), with which opening is associated a stationary index-point 86 past which the graduations move when the shaft 66 is rotated. Secured to the outer extremity of the shaft is a hand-crank 88. When this is turned, the sleeve 58 is raised or lowered through the gearing 65, 64 and the threaded sleeve 56, and the spring 60 correspondingly compressed or allowed to expand. There is thus placed upon the spring a load indicated by the graduations 82. This limits to a definite amount the force which may be applied through the spring by the secondary slide 46 to the primary slide 36, and, therefore, to the jacked work by the heel-engaging members 40 and 42 carried by the latter slide.

To move the secondary slide 46 for the application of the above pressure, there projects rearwardly from it an arm 90, in which is clamped a nut 92 (Figs. 4 and 7). Engaging the nut is the upper threaded portion 93 of a vertical spindle 94, having bearings in a bracket 95 attached to the inside of the frame-column. Rotatable about the spindle is an upper sleeve 96 constantly driven by worm-gearing 98, a horizontal shaft 100 and spur-gearing 102 from the main driving shaft 26 (Fig. 1). Bevel-gearing 104 rotates in the opposite direction about the spindle 94 a lower sleeve 106. Upon the inner opposed ends of the sleeves are portions of a jaw-clutch c, either of which may be engaged by an intermediate clutch-sleeve 108 splined to the spindle. Thus, by raising the sleeve 108, the spindle may be driven so its screw 93 and the nut 92 will lower the slide 46, and therefore the slide 36, to clamp the work upon the jack 20 under a pressure limited by the load upon the spring 60, or by lowering said sleeve, the opposite rotation of the spindle will elevate the slide 36 through the rod 59.

The driven clutch-sleeve 108 is normally in its central position, disengaged from both the driving sleeves 96 and 106, as appears in Fig. 1 Riding in a peripheral groove in the sleeve 108 are the ends of the yoked arm 112 of a four-armed bell-crank-lever l, which is fulcrumed at 114 on the bracket 95. A second arm 116 of the lever has a projection 118 lying in a vertical slot 121 in a rod 120, joined to the treadle 30. The lever l is held yieldably with the clutch c in neutral by a latch-lever 122, fulcrumed upon the frame and provided at one end with a roll 124, this roll being forced by an expansion-spring 126 acting upon the latch-lever into a depression 128 in a depending arm 130 of the lever l. The treadle-rod is elevated at this time by a compression-spring 132, which is interposed between the frame and an enlargement upon the upper end of the rod, in which the slot 121 is formed. When the operator depresses the treadle to cause the application of pressure to the work, the upper extremity of the slot strikes the rod-projection 118 and raises the lever-arm 112. The clutch-sleeves 108 and 96 are now in engagement, and the spindle 94 is so rotated that its screw 93 and the nut 92 lower the secondary slide 46. This movement is transmitted through the spring 60 to the primary slide 36 with the head bearing the heel-engaging portions 40 and 42, to apply pressure to the jacked work with a force determined by the load which has been placed upon the spring 60 by manipulation of the crank 88. For any further movement of the secondary slide, the spring yields. In the counterclockwise movement of the lever $l$ for engagement of the upper section of the clutch $c$, the arm 130 is swung to the right (Fig. 4), and the roll 124 rests against a surface 134 on the end of the arm 130 to hold up the arm 112.

When the full clamping pressure has been applied to the work, the clutch $c$ is thrown automatically into neutral, and the main clutch $C$ is engaged to effect the reciprocation of the drivers 24 and the insertion of the nails which they carry. As the primary slide 36 is lowered by the secondary slide 46 in the application of pressure to the work, the rod 59 travels down with it, until its lower extremity is opposite a roll 140 on the end of an arm 142 of the lever $l$. When the depression of the primary slide has brought the members 40 and 42 against the heel H, its movement is checked and continued travel of the secondary slide acts through the spring 60 to apply to the work its final pressure to the degree which the loading of the spring permits. Finally, since the spring is now being compressed, the secondary slide descends while the primary slide remains at rest. Consequently, the horizontally movable slide 63 is carried rearwardly by the engagement of the pin 61 with the cam-slots 62. Depending from the slide 63 is an arm 144, which lies in proximity and parallel to the end of the rod 59. This arm pressing against the roll 140 turns the lever $l$ clockwise, and, as full clamping pressure is placed upon the work, the arm 112 of the lever will have disengaged the clutch $c$ and the depression 128 in the arm 130 will retain it in neutral position.

As soon as the clutch members 108 and 96 are engaged, the operator may remove his foot from the treadle and the machine will normally complete its operating cycle. If, at any time during the application of clamping pressure, and before the clutch has reached neutral, the operator wishes to readjust the work on the jack, he may lift a handle 145 projecting from the end of the lever-arm 116. The pin 118 rises in the slot 121 of the treadle-rod, the clutch members 108 and 106 are engaged and the screw 93 rotated to lift the primary slide 36, thus relieving the work of holddown-pressure.

As the work-clamping movement of the holddown is stopped by the opening of the clutch $c$, the clutch $C$ is engaged to start rotation of the main driving shaft 26 and thereby reciprocate the drivers 24. When the slide 63 is moved by the pin 61, its rear extremity presses against a roll 150 (Figs. 9 and 10) carried by the upper arm 152 of a lever 153 mounted to turn upon the rear of the portion 50 of the primary slide. From a downward extension of the lever 153 (Fig. 9) projects an arm 154 terminating in a gear-segment 156. This segment meshes with an elongated segment 158 attached to a vertical shaft 160, rotatable in the frame-bracket 95. A torsion-spring 164 surrounding the shaft 160 maintains the roll 150 against the end of the slide 63. The shaft 160 is joined by bevel-gear 166 to a horizontal shaft 168, journaled in the bracket 95 (Fig. 12). Fast on the rear extremity of the shaft 168 is an arm 170 (Fig. 13), upon which is a roll 172 lying just below a shoulder 173 on a clutch-tripping rod 174. The lower extremity of the rod is guided by a slot-and-pin connection 175 on the base of the column 22 (Figs. 1 and 14). The rearward movement of the horizontal slide 63 by the secondary slide-projection 81, through the chain of elements just noted, lifts the rod 174 to produce engagement of the clutch $C$ and thereby the nail-inserting reciprocation of the drivers 24.

As soon as the shaft 26 is thus started in rotation, the cam 176, which it carries, serves to lock the holddown P independently of its actuating mechanism. Situated below the shaft in the lower portion of the frame-column 22 is a cylinder 178 (Figs. 3 and 4), containing a body of liquid, such as oil, and suspended by spaced rods 180, 180 from the primary holddown-slide 36. In the cylinder is a stationary piston 182, carried by a bridge-piece 184 attached to the frame-column 22. The piston is tubular and its lower extremity furnishes a seat for a valve 186. The rod 188 of this valve is guided into the bridge-piece, and has rotatable upon its upper extremity a roll 190 forced by an expansion-spring 192 against the periphery of the cam 176. This cam, as appears in Fig. 3, normally holds the rod 188 down and the valve 186 open. Consequently, when the slide 36 is brought down to effect clamping of the work, the cylinder 178 moves freely with it, the displaced oil passing through the open valve between the interior of the piston and the cylinder. As soon as the rotation of the cam 176 begins, it frees the valve-stem (Fig. 5), the valve closes, and the oil is retained beneath the piston. Since the reactive force of the work tending to displace the holddown upwardly cannot materially compress the oil, said holddown is locked through the cylinder, piston and bridge-piece to the frame 22, removing the stress from the secondary slide and its associated elements.

The nail-inserting operation having been performed, the holddown is to be returned to its initial position to free the heeled shoe upon the jack 20. This is effected by shifting the intermediate clutch-sleeve 108 into engagement with the lower sleeve 106, which is being driven oppositely to the sleeve 96. The driving shaft 26 has fast upon it a disk 200 (Fig. 6), in which is a cam-groove 202 (Fig. 3). Lying in the groove is a roll 204 on a slide 206, guided for vertical movement in a portion of the bracket 95. Upon the upper end of the slide 206 is a cam-incline 210, which, up to the time the drivers have completed the insertion of the nails, is situated just below a roll 212 rotatable on the arm 138 of the lever $l$ (Fig. 1). Then, the cam-groove 202 acting upon the roll 204 lifts the slide 206. The cam-surface 210 is forced against the roll 212, turning the lever $l$ clockwise (Fig. 6) to lower the clutch-sleeve 108 and so rotate the screw 93 as to elevate the holddown. The cam 176 has lowered the valve 186, allowing the oil in the cylinder 178 to rise within the piston 182, so the holddown is freed to permit its elevation. The lever $l$ is temporarily retained in this position by the entrance of the latching roll 124 into a depression 214 in the end of the arm 130. The slide 206 is lowered by the cam 204 to its initial position. The holddown continues to rise to its normal relation to the jack 20. To stop the movement at this point, arm 90 of the secondary slide 46 has projecting from it a lug 216, through an opening in which passes a vertical rod 218 connected at 220 to the arm 112 of the lever $l$. Threaded upon the rod are a nut and lock-nut 222. These are so adjusted that, when the rising lug strikes them, it lifts the rod and turns the lever $l$ counterclockwise to shift the clutch-sleeve 108 to neutral, stopping the rotation of the screw. At the same time, the neutral depression 128 of the lever is brought into engagement with the roll 124, and all the elements have been restored to normal (Fig. 1). There is also shown on the rod 218 below the lug 216 a nut and lock-nut 224. If the machine should be started in operation by depression of the treadle 30 when there was no work upon the jack, the lug would contact with these nuts and, by lowering the rod, would turn the lever *l* clockwise. This would put the clutch *c* into neutral, stopping the descent of the holddown before the members 40 and 42 reach the jack-top.

To outline briefly the operation of the heeling machine, particularly as concerns the pressure mechanism of this invention, with the elements as they appear in Fig. 1 of the drawings, the operator actuates the lever 34 to reciprocate the loader-block of the mechanism L, thereby delivering a load of nails to the jack 20. He then jacks a shoe S, positions a heel H upon its heel-seat beneath the raised holddown members 40 and 42, and represses the treadle against the light resistance of the supporting spring 132. At this time, the clutch *c* was in neutral, its actuating lever *l*, the arm 112 of which carries the driving member 108, being retained by the engagement of the latch-lever 122 with the depression 128 in the arm 130 of the lever *l*. By the action of the treadle-rod 120 upon the arm 116 of said lever, the arm 112 is turned counterclockwise (Fig. 4) to produce driving engagement between the clutch members 108 and 96, the latching lever 122 now engaging a surface 134 on the end of the lever-arm 130. Through the clutch, the screw 93 is rotated to lower its nut 92 and, therefore, the secondary slide 46. This, acting through the spring 60, so initially loaded by the operator through rotation of the crank 88 as to limit the pressure which it can transmit, carries the primary slide 36 down to cause the members 40 and 42 to contact with the heel and clamp it against the heel-seat of the jacked shoe. Upon yield of the spring, when a predetermined pressure has been applied to the work, the secondary slide moves down independently of the primary slide, the latter being held by the heel. The horizontally movable slide 63 on the primary slide is thereupon actuated by the projection 61 on the slide-rod 59, and, by engagement with the arm 142 of the lever *l*, returns it to the neutral position of Fig. 1 to open the clutch *c*. The pressure-movement of the holddown is therefore stopped, and the slide 63 through its action on the lever 153 (Figs. 9 and 10) lifts the arm 170 to trip the main clutch C. The shaft 26 is started in rotation, turning through 360° and coming to rest. The cam 176 at once releases the valve 186 to close the passage between the cylinder 178 and the piston 182, the former being joined to the primary slide and the latter to the frame of the machine. The holddown is consequently locked against elevation, independently of the mechanism which applied pressure to it.

In the continued rotation of the shaft 26, the drivers 24 are raised to insert in the work the heel-attaching nails which they carry. The attachment of the heel to the shoe having thus been completed, the cam-disk 200 (Fig. 6) on the shaft 26 raises the slide 206. This, acting upon the arm 130 of the lever *l*, shifts the member 108 of the clutch *c* from neutral to a position in which it is temporarily retained by the engagement of the latch-lever with the depression 214 in the lever-arm 130. The direction of rotation of the screw 93 is now reversed, and the slides 46 and 36 are raised until stopped by the clutch *c* being put into neutral when the lug 216 of the secondary slide strikes the nuts 222 upon the rod 218 attached to the arm 112 of the lever *l*. The elements are now restored to the position represented in Fig. 1, with the members 40 and 42 fully raised, so the operator may remove the heeled shoe from the jack. If at any time during the use of the machine the pressure applied to the work is too little or too great, the operator may alter it by actuation of the crank 88 with a consequent change in the load upon spring 60. In doing this, he is guided by the reading of the graduations 82. In this way, without any substantial interruption in his work, the pressure may be adapted readily to compressibility of the materials operated upon.

Having described my invention, what I claim as new and desire to secure by Letters Patent of the United States is:

1. In combination, a frame, a work-support mounted thereon, a pressure member co-operating with the support, power mechanism acting to produce relative movement between the support and pressure member to clamp the work upon the support, a member movable by the operator to initiate the action of the power mechanism, means for disconnecting the power mechanism from the clamping element being moved when the clamping pressure has attained a predetermined amount, a member secured to the clamping element and mounted to move therewith, a member secured against movement on the frame, and means for connecting the two last mentioned members together to prevent the movement of that secured to the clamping element.

2. In combination, a work-support, a pressure member co-operating with the support, power mechanism acting to produce relative movement between the support and pressure member to clamp the work upon the support, mechanism actuated by the power mechanism for operating upon the clamped work, a member movable by the operator to initiate the action of the power mechanism, and means for disconnecting the power mechanism from the clamping element being moved when the clamping pressure has attained a predetermined amount and for thereafter connecting the power mechanism and operating mechanism for the operation of the latter upon the work.

3. In combination, a work-suport, a pressure member co-operating with the support, power mechanism acting to produce relative movement between the support and pressure member to clamp the work upon the support, pressure-limiting mechanism through which the clamping force of the power mechanism is transmitted, a member movable by the operator to initiate the action of the power mechanism, and means controlled by the limiting mechanism for disconnecting the power mechanism from the clamping element being moved.

4. In combination, a work-support, a pressure member co-operating with the support, power mechanism acting to produce relative movement between the support and pressure member to clamp the work upon the support, pressure-limiting mechanism through which the clamping force of the power mechanism is transmitted, a member movable by the operator to initiate the action of the power mechanism, and means controlled by the limiting mechanism for disconnecting the power mechanism from the clamping element being moved and for connecting said element to a relatively fixed point to prevent its retraction.

5. In combination, a work-support, a pressure member co-operating with the support, power mechanism acting to produce relative movement between the support and pressure member to clamp the work upon the support, pressure-limiting mechanism through which the clamping force of the power mechanism is transmitted, mechanism actuated by the power mechanism for operating upon the clamped work, a member movable by the operator to initiate the action of the power mechanism, means controlled by the limiting mechanism for disconnecting the power mechanism from the clamping element being moved, and means controlled by the power mechanism for reversing the movement of the clamping element.

6. In combination, a work-support, a pressure member co-operating with the support, power mechanism acting to produce relative movement between the support and pressure member to clamp the work upon the support, pressure-limiting mechanism through which the clamping force of the power mechanism is transmitted, mechanism actuated by the power mechanism for operating upon the clamped work, a member movable by the operator to initiate the action of the power mechanism, means controlled by the limiting mechanism for disconnecting the power mechanism from the clamping element being moved, means controlled by the power mechanism for reversing the movement of the clamping element, and means controlled in such reverse movement for stopping the clamping element.

7. In a heel-attaching machine, a jack, fastening-drivers movable in the jack, a heel-holddown co-operating with the jack, a movable primary carrier for the holddown, a movable secondary member, means for moving the secondary member, a spring through which movement of the secondary member is transmitted to the primary carrier, and means for moving the secondary member to clamp a heel yieldably upon a jacked shoe.

8. In a fastening-inserting machine, a jack, a holddown member co-operating therewith, a movable primary carrier for the holddown, a movable secondary member, means for moving the secondary member, a spring through which movement of the secondary member is transmitted to the primary carrier, and means arranged to apply to the spring a normal load limiting the force which may be transmitted.

9. In a fastening-inserting machine, a jack, a holddown member co-operating therewith, a movable primary carrier for the holddown, a secondary member movable relatively to the primary carrier, means for moving the secondary member, a spring through which movement of the secondary member is transmitted yieldably to the primary carrier, power mechanism, a clutch through which the secondary member is moved from the power mechanism, and means effective in the yield of the spring and consequent relative movement between the primary and secondary members for controlling the clutch.

10. In a fastening-inserting machine, a jack, a holddown member co-operating therewith, a movable primary carrier for the holddown, a secondary member movable upon the primary carrier, means for moving the secondary member, a spring through which movement of the secondary member is transmitted yieldably to the primary carrier, power mechanism, a clutch through which the secondary member is moved from the power mechanism, a member movable by the operator to engage the clutch, drivers reciprocable in the jack, a clutch through which the drivers are reciprocated, and means effective in the yield of the spring for causing the engagement of the driver-clutch.

11. In a fastening-inserting machine, a jack, a holddown member co-operating therewith, a movable primary carrier for the holddown, a secondary member movable upon the primary carrier, means for moving the secondary member, a spring through which movement of the secondary member is transmitted yieldably to the primary carrier, power mechanism, a clutch through which the secondary member is moved from the power mechanism, a member movable by the operator to engage the clutch, drivers reciprocable in the jack, a single-rotation clutch through which the drivers are reciprocated, and means effective in the yield of the spring for causing the engagement of the single-rotation clutch and the consequent disengagement of the clutch for the secondary member.

12. In a fastening-inserting machine, a jack, a holddown member co-operating therewith, a movable primary carrier for the holddown, a secondary member movable upon the primary carrier, means for moving the secondary member, a spring through which movement of the secondary member is transmitted yieldably to the primary carrier, power mechanism, a clutch through which the secondary member is moved from the power mechanism, a member movable by the operator to engage the clutch, drivers reciprocable in the jack, a single rotation clutch through which the drivers are reciprocated, and means effective in the yield of the spring for causing the engagement of the single-rotation clutch and the consequent disengagement of the clutch for the secondary member after a predetermined force has been transmitted by the spring.

13. In a fastening-inserting machine, a frame, a jack mounted thereon, a holddown member co-operating with the jack, a movable primary carrier for the holddown, a movable secondary member, means for moving the secondary member, a spring through which the movement of the secondary member is transmitted to the primary carrier, and means for locking the primary carrier to the frame.

14. In a fastening-inserting machine, a frame, a jack mounted thereon, a holddown member co-operating with the jack, a movable primary carrier for the holddown, a secondary member movable on the primary carrier, means for moving the secondary member, a spring through which the movement of the secondary member is yieldably transmitted to the primary carrier, a cylinder and co-operating tubular piston, one joined to the primary carrier and the other to the frame, a valve governing communication between the cylinder and piston, and means controlled in the yield of the spring for operating the valve.

15. In a fastening-inserting machine, a frame, a jack mounted thereon, a holddown member co-operating therewith, a movable primary carrier for the holddown, a secondary member movable upon the primary carrier, means for moving the secondary member, a spring through which movement of the secondary member is transmitted yieldably to the primary carrier, drivers reciprocable in the jack, a clutch through which the drivers are reciprocated, means effective in the yield of the spring for controlling the clutch, a cylinder movable with the primary carrier, a tubular piston joined to the frame, a valve governing connection between the cylinder and piston, and means controlled by the clutch for operating the valve.

16. In combination, a work-support, a primary slide, a work-engaging member carried by the primary slide, a movable secondary slide, a rotatable screw by which the secondary slide is moved, a spring through which the movement of the secondary slide is transmitted to the primary slide, and means for rotating the screw in opposite directions.

17. In combination, a work-support, a primary slide, a work-engaging member carried by the primary slide, a secondary slide movable upon the primary slide, a rotatable screw by which the secondary slide is moved, a compressible spring through which the movement of the secondary slide is transmitted to the primary slide, means for rotating the screw in opposite directions, a clutch through which the direction of rotation of the screw is controlled, means arranged to engage the clutch, a member movable upon the primary slide for disengaging the clutch, and means acting upon the compression of the spring for moving the member.

18. In combination, a work-support, a primary slide, a work-engaging member carried by the primary slide, a secondary slide movable upon the primary slide, a rotatable screw by which the secondary slide is moved, a compressible spring through which the movement of the secondary slide is transmitted to the primary slide, means for rotating the screw in opposite directions, a clutch through which the direction of rotation of the screw is controlled, means arranged to engage the clutch, a member movable upon the primary slide for disengaging the clutch, means acting upon the compression of the spring for moving the member, and means for again engaging the clutch to rotate the screw in the opposite direction.

19. In combination, a work-support, a primary slide, a work-engaging member carried by the primary slide, a secondary slide movable upon the primary slide, a rotatable screw by which the secondary slide is moved, a compressible spring through which the movement of the secondary slide is transmitted to the primary slide, means for rotating the screw in opposite directions, a clutch through which the direction of rotation of the screw is controlled, means arranged to engage the clutch to produce rotation of the screw for work-engagement, a member movable upon the primary slide for disengaging the clutch, means acting upon compression of the spring for moving the member, means for again engaging the clutch to rotate the screw in the opposite direction to retract the slides, and means acting in the retraction of the slides for disengaging the clutch.

20. In combination, a work-support, a primary slide, a work-engaging member carried by the primary slide, a movable secondary slide, a rotatable screw by which the secondary slide is moved, a spring through which the movement of the secondary slide is transmitted to the primary slide, means for rotating the screw in opposite directions, and means for stopping the rotation of the screw to limit the travel of the slides in both directions.

21. In combination, a work-support, a primary slide, a work-engaging member carried by the primary slide, a movable secondary slide, a rotatable screw by which the secondary slide is moved, a spring engaged at its opposite extremities by the primary and secondary slides, respectively, means for changing the distance between the engaging portions of the slides to vary the load upon the spring, and means for rotating the screw in opposite directions.

22. In combination, a work-support, a primary slide, a work-engaging member carried by the primary slide, a movable secondary slide, a rotatable screw by which the secondary slide is moved, a spring through which the movement of the secondary slide is transmitted to the primary slide, means for locking the primary slide against movement independently of the spring, and means for rotating the screw in opposite directions.

23. In combination, a work-support, a primary slide, a work-engaging member carried by the primary slide, a secondary slide movable upon the primary slide, a rotatable screw by which the secondary slide is moved, a compressible spring through which the movement of the secondary slide is transmitted to the primary slide, means for rotating the screw in opposite directions, a clutch through which the direction of rotation of the screw is controlled, means arranged to engage the clutch to produce rotation of the screw for work-engagement, a member movable upon the primary slide for disengaging the clutch, means acting upon the compression of the spring for moving the member, a power shaft, and a cam rotatable by the power-shaft for again engaging the clutch to rotate the screw in the opposite direction.

24. In combination, a work-support, a primary slide, a work-engaging member carried by the primary slide, a movable secondary slide, a rotatable screw by which the secondary slide is moved, a spring through which the movement of the secondary slide is transmitted to the primary slide, means for locking the primary slide against movement independently of the spring, a power-shaft, a cam rotatable by the power-shaft for controlling the locking means, and means for rotating the screw in opposite directions.

JOHN T. LANCASTER.

REFERENCES CITED

The following references are of record in the file of this patent:

UNITED STATES PATENTS

| Number | Name | Date |
|---|---|---|
| Re. 8,706 | Blaney | May 13, 1879 |
| 130,150 | Perkins et al. | Aug. 6, 1872 |
| 859,887 | Mayo | July 9, 1907 |
| 881,478 | Mayo | Mar. 10, 1908 |
| 1,427,940 | Blake | Sept. 5, 1922 |
| 2,001,002 | Thomas | May 14, 1935 |